(12) United States Patent
Reinke et al.

(10) Patent No.: US 12,258,476 B2
(45) Date of Patent: *Mar. 25, 2025

(54) WARM MIX ASPHALT BINDER COMPOSITIONS CONTAINING LUBRICATING ADDITIVES

(71) Applicants: A.L.M. Holding Company, Onalaska, WI (US); Ergon Asphalt & Emulsions, Inc., Jackson, MS (US)

(72) Inventors: Gerald H. Reinke, La Crosse, WI (US); Gaylon L Baumgardner, Arkadelphia, AR (US); Steven L. Engber, Onalaska, WI (US)

(73) Assignees: A.L.M. Holding Company, Onalaska, WI (US); Ergon Asphalt & Emulsions, Inc., Jackson, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,089

(22) Filed: Feb. 2, 2023

(65) Prior Publication Data

US 2023/0257585 A1 Aug. 17, 2023

Related U.S. Application Data

(60) Continuation of application No. 16/267,830, filed on Feb. 5, 2019, which is a continuation of application No. 14/926,752, filed on Oct. 29, 2015, now Pat. No. 10,214,646, which is a continuation of application No. 14/223,569, filed on Mar. 24, 2014, now Pat. No. 9,394,652, which is a continuation of application No. 13/683,043, filed on Nov. 21, 2012, now Pat. No. 8,679,245, which is a continuation of application No. 13/112,815, filed on May 20, 2011, now Pat. No. 8,323,394, which is a continuation of application No. 12/896,570, filed on Oct. 1, 2010, now Pat. No. 7,968,627, and a continuation of application No. 12/896,532, filed on Oct. 1, 2010, now Pat. No. 7,981,952, and a continuation of application No. 12/896,488, filed on Oct. 1, 2010, now Pat. No. 7,981,466, which is a division of application No. 11/871,782, filed on Oct. 12, 2007, now Pat. No. 7,815,725.

(60) Provisional application No. 60/976,141, filed on Sep. 28, 2007, provisional application No. 60/970,809, filed on Sep. 7, 2007.

(51) Int. Cl.
| | |
|---|---|
| *C08L 95/00* | (2006.01) |
| *C04B 26/26* | (2006.01) |
| *C08K 5/00* | (2006.01) |
| *C09D 195/00* | (2006.01) |
| *E01C 7/26* | (2006.01) |
| *E01C 19/08* | (2006.01) |
| *E01C 19/10* | (2006.01) |
| *C04B 111/00* | (2006.01) |
| *C08K 5/17* | (2006.01) |
| *C08K 5/521* | (2006.01) |

(52) U.S. Cl.
CPC .............. *C08L 95/00* (2013.01); *C04B 26/26* (2013.01); *C08K 5/0008* (2013.01); *C09D 195/00* (2013.01); *E01C 7/265* (2013.01); *E01C 19/08* (2013.01); *E01C 19/10* (2013.01); *C04B 2111/0075* (2013.01); *C08K 5/17* (2013.01); *C08K 5/521* (2013.01); *C08L 2555/24* (2013.01); *C08L 2555/34* (2013.01); *C08L 2555/40* (2013.01); *C08L 2555/60* (2013.01); *C08L 2555/72* (2013.01); *C08L 2555/80* (2013.01); *Y02A 30/30* (2018.01); *Y02W 30/91* (2015.05)

(58) Field of Classification Search
CPC ........................................................ C08L 95/00
See application file for complete search history.

(56) References Cited

U.S. PATENT DOCUMENTS

| | | | |
|---|---|---|---|
| 1,014,103 | A | 1/1912 | Wallbaum |
| 1,373,661 | A | 4/1921 | Johansen |
| 1,384,805 | A | 7/1921 | McSwiney |
| 1,542,626 | A | 6/1925 | MacKay |
| 1,640,544 | A | 8/1927 | Headley |
| 1,674,523 | A | 6/1928 | Sadtler |
| 1,778,760 | A | 10/1930 | Hay |
| 1,815,089 | A | 7/1931 | Alsdorf |
| 1,834,552 | A | 12/1931 | Sadtler et al. |
| 1,842,139 | A | 1/1932 | Alsdorf |
| 1,887,518 | A | 11/1932 | Sadtler |
| 1,888,295 | A | 11/1932 | Smith |
| 1,932,648 | A | 10/1933 | Taylor |

(Continued)

FOREIGN PATENT DOCUMENTS

| | | |
|---|---|---|
| AU | 433003 | 2/1973 |
| AU | 2006231250 | 10/2006 |

(Continued)

OTHER PUBLICATIONS

WO 1999011737 WIPO Machine Translation (Year: 2024).*

(Continued)

*Primary Examiner* — Alexandra M Moore
(74) *Attorney, Agent, or Firm* — Kagan Binder, PLLC

(57) ABSTRACT

The present invention provides a functionally dry warm mix asphalt binder composition modified with lubricating agents or additives that can be mixed with aggregate and compacted at temperatures substantially below asphalt binder compositions that do not contain the disclosed lubricating additives.

21 Claims, 4 Drawing Sheets

(56) References Cited

U.S. PATENT DOCUMENTS

| | | |
|---|---|---|
| 1,948,881 A | 2/1934 | Kirschbaum |
| 1,988,336 A | 1/1935 | Roediger |
| 1,988,879 A | 1/1935 | Steininger |
| 2,023,068 A | 12/1935 | Flood |
| 2,025,945 A | 12/1935 | Forrest |
| 2,046,902 A | 7/1936 | Kirschbaum |
| 2,087,401 A | 7/1937 | Fair |
| 2,191,295 A | 2/1940 | Dohse |
| 2,550,481 A | 4/1941 | Jense |
| 2,243,519 A | 5/1941 | Barth |
| 2,283,192 A | 5/1942 | Ditto |
| 2,317,959 A | 4/1943 | Johnson et al. |
| 2,340,449 A | 2/1944 | Barwell |
| 2,374,732 A | 5/1945 | Colburn |
| 2,427,488 A | 9/1947 | Anderson et al. |
| 2,461,971 A | 2/1949 | Fischer |
| 2,861,787 A | 11/1958 | Csanyi |
| 2,888,418 A | 5/1959 | Albanese et al. |
| 2,901,369 A | 8/1959 | Pordes |
| 2,917,395 A | 12/1959 | Csanyi |
| 3,855,167 A | 12/1974 | Bowman |
| 3,904,428 A | 9/1975 | McConnaughay |
| 4,197,209 A | 4/1980 | Zinke et al. |
| 4,198,177 A | 4/1980 | Brett et al. |
| 4,234,346 A | 11/1980 | Latta, Jr. et al. |
| 4,244,747 A | 1/1981 | Leonard, Jr. et al. |
| 4,348,237 A | 9/1982 | Ruckel |
| 4,592,507 A | 6/1986 | Benedict |
| 4,692,350 A | 9/1987 | Clarke et al. |
| 4,724,003 A | 2/1988 | Treybig et al. |
| 4,743,304 A | 5/1988 | Gilmore et al. |
| 4,836,857 A | 6/1989 | Hopkins |
| 5,109,041 A | 4/1992 | Matsuno et al. |
| 5,539,029 A | 7/1996 | Burris |
| 5,622,554 A | 4/1997 | Krogh et al. |
| 5,721,296 A | 2/1998 | Mizunuma et al. |
| 5,772,749 A | 6/1998 | Schilling et al. |
| 5,788,755 A | 8/1998 | Salminen |
| 5,827,360 A | 10/1998 | Salminen |
| 5,925,233 A | 7/1999 | Miller et al. |
| 6,117,926 A | 9/2000 | Engber et al. |
| 6,136,898 A | 10/2000 | Loza et al. |
| 6,197,837 B1 | 3/2001 | Hill et al. |
| 6,399,680 B1 | 6/2002 | Engber et al. |
| 6,451,885 B1 | 9/2002 | Dresin et al. |
| 6,559,206 B1 | 5/2003 | Durand et al. |
| 6,576,050 B1 | 6/2003 | Samanos |
| 6,588,974 B2 | 7/2003 | Hildebrand et al. |
| 6,793,964 B2 | 9/2004 | Hoad |
| 6,846,354 B2 | 1/2005 | Larsen et al. |
| 6,913,416 B2 | 7/2005 | Hildebrand et al. |
| 7,041,165 B2 | 5/2006 | Malot |
| 7,114,843 B2 | 10/2006 | Romier et al. |
| 7,114,875 B2 | 10/2006 | Romier et al. |
| 7,160,943 B2 | 1/2007 | Burris et al. |
| 7,297,204 B2 | 11/2007 | Crews et al. |
| 7,309,390 B2 | 12/2007 | Falkiewicz |
| 7,815,725 B2 | 10/2010 | Reinke et al. |
| 7,902,277 B2 | 3/2011 | Reinke et al. |
| 7,951,858 B2 | 5/2011 | Barreto et al. |
| 7,968,627 B2 | 6/2011 | Reinke et al. |
| 7,981,466 B2 | 7/2011 | Reinke et al. |
| 7,981,952 B2 | 7/2011 | Reinke et al. |
| 8,138,242 B2 | 3/2012 | Reinke et al. |
| 8,323,394 B2 | 12/2012 | Reinke et al. |
| 8,404,037 B2 | 3/2013 | Naidoo et al. |
| 8,440,011 B2 | 5/2013 | Naidoo et al. |
| 8,679,245 B2 | 3/2014 | Reinke et al. |
| 8,840,717 B2 | 9/2014 | Naidoo et al. |
| 9,394,652 B2 | 7/2016 | Reinke et al. |
| 10,214,646 B2 | 2/2019 | Reinke et al. |
| 2002/0170464 A1 | 11/2002 | Larsen et al. |
| 2004/0014845 A1 | 1/2004 | Takamura et al. |
| 2004/0223808 A1 | 11/2004 | Romier et al. |
| 2004/0244646 A1 | 12/2004 | Larsen et al. |
| 2005/0018530 A1 | 1/2005 | Romier et al. |
| 2005/0284333 A1 | 12/2005 | Falkiewicz |
| 2006/0086288 A1 | 4/2006 | Bourrel et al. |
| 2006/0169173 A1 | 8/2006 | Dupuis et al. |
| 2006/0236614 A1 | 10/2006 | Antoine et al. |
| 2006/0240185 A1 | 10/2006 | Antoine et al. |
| 2006/0288907 A1 | 12/2006 | Fox |
| 2007/0039520 A1 | 2/2007 | Crews et al. |
| 2007/0060676 A1 | 3/2007 | Reinke |
| 2007/0082983 A1 | 4/2007 | Crews et al. |
| 2007/0169668 A1 | 7/2007 | Moss et al. |
| 2007/0191514 A1 | 8/2007 | Reinke et al. |
| 2009/0088499 A1 | 4/2009 | Barreto et al. |
| 2010/0055304 A1 | 3/2010 | Reinke et al. |
| 2011/0152410 A1 | 6/2011 | Reinke |
| 2012/0213584 A1 | 8/2012 | Reinke et al. |
| 2019/0218395 A1 | 7/2019 | Reinke et al. |

FOREIGN PATENT DOCUMENTS

| | | |
|---|---|---|
| AU | 2007255222 C1 | 12/2007 |
| CN | 1644625 | 12/2004 |
| EP | 0077632 A1 | 4/1983 |
| EP | 0568021 | 11/1993 |
| EP | 0994923 | 4/2000 |
| EP | 1398351 | 3/2004 |
| EP | 1263885 | 6/2004 |
| EP | 1469038 | 10/2004 |
| EP | 2062943 A1 | 5/2009 |
| EP | 3425007 A1 | 1/2019 |
| EP | 2185649 B1 | 5/2019 |
| GB | 429548 | 5/1935 |
| GB | 783015 | 9/1957 |
| GB | 2234512 | 8/1989 |
| JP | 2002/332606 | 11/2002 |
| JP | 2006/132131 | 5/2006 |
| WO | WO 1995/0022661 | 8/1995 |
| WO | WO-9911737 A1 * | 3/1999 ............. C08L 95/00 |
| WO | WO 99/57199 | 11/1999 |
| WO | 00/56346 A1 | 9/2000 |
| WO | WO 2001/16233 | 3/2001 |
| WO | WO 2001/062852 | 8/2001 |
| WO | WO 2002/016499 | 2/2002 |
| WO | WO 2002/103116 | 12/2002 |
| WO | WO 2005/081775 | 9/2005 |
| WO | WO 2006/106222 | 10/2006 |
| WO | WO 2007/032915 | 3/2007 |
| WO | 2007054503 A1 | 5/2007 |
| WO | WO 2007/112335 | 10/2007 |
| WO | WO 2008/148974 | 12/2008 |
| WO | WO 2009/033060 | 3/2009 |

OTHER PUBLICATIONS

AKZO International Highway Chemical Newsletter, Chemical Division, Spring 1989, pp. 1-9.

Anderson, David A., et al., "The Effect of Antistrip Additives on the Properties of Asphalt Cement," Asphalt Paving Technology 1982, Proceedings Association of Asphalt Paving Technologists Technical Sessions, Kansas City, Missouri, vol. 51, Feb. 22, 23 & 24, 1982, pp. 298-317.

Anonymous (2011): "Recommended Mixing and Compaction Temperatures for Performance Graded (PG) Binders (Unmodified PG Binders and Modified PG Binders)", retrieved from the internet: URL: www.asphalt.materials.com/doc/flyers/CompactionTemperatures.pdf, retrieved on Jul. 13, 2017..

Barreto, "Warm Asphalt Mixes Containing Dispersed Water," Arkema-Ceca France, Abstract No. 658, 2006, 7 pp.

Boldyrev et al., Experience in Using AMDOR-9 Adhesion Additive in the Practice of Road Construction, International Conference 'Bitumen in road construction, 2005.

Bonola et al., "Technologies for the Production of Asphalt Mixes with Low Temperature Processes," World Road Association Italian National Committee, Dec. 2005, 31 pp.

Butz et al., "Motification of Road Bitumens with the Fischer-Tropsch Paraffin Sasobit," Journal of Applied Asphalt Technology, Oct. 2001.

(56) References Cited

OTHER PUBLICATIONS

Caillot et al., "Warm Mix Asphalts and Cold Recycling for Controlled Use of Effective Road Techniques Reducing Nuisances," Technical Department for Transport, Roads, and Bridges, Engineering for Road Safety, Ministry for Transport, Infrastructure, Tourism and the Sea, France, 12 pp.
Ceca Arkema Group, "Green Road Formulation-Warm Asphalt Mix. 2007 Innovation: helping to lower our planet's temperature," www.siliporite.com, accessed Nov. 21, 2007, 1 pg.
Cervarich, "Cooling Down the Mix" NAPA Explores New "Warm Mix Asphalt" Technologies Developed in Europe, Hot Mix Asphalt Technology, Mar./Apr. 2003, pp. 13-16.
Chiman, "Aspects of Influence of Additives on Characteristics of Non-Polimetricos Asphalt," Corporation for Research and Development in Asphalt Transport Sector and Industrial Corasfaltatos.
Choi, Y., Warm Asphalt Review, Austroads Report, Arrb Research, RETT220B, Publication No. AP-T91/07, Nov. 2007.
Damm, K., Abraham, J., Butz, T., Hildebrand, G., Riebesehl, G., "Asphalt Flow Improvers as Intelligent Fillers for Hot Asphalts—A New Chapter in Asphalt Technology," Journal of Applied Asphalt Binder, vol. 2, Issue 1, p. 36-70, Apr. 2002.
Declaration of Patrick Lavin, Jun. 6, 2011; explains 26 years of experience with essentially water-free, non-foaming binders along with the use of additives and the effects of temperature on paving.
Declaration of Gerald H. Reinke Under 37 CFR 1.132, Jun. 1, 2012.
Declaration of Jan Alboszta Under 37 CFR 1.132, Jun. 1, 2012.
Diefenderfer et al., "Research Report: Installation of Warm Mix Asphalt Projects in Virginia," Virginia Transportation Research Council, Apr. 2007, 34 pp.
DIN 1995 Requirements for the Binders, Oct. 1989.
Edwards et al., "Rehological effects of commercial waxes and polyphosphoric acid in bitumen 160/220—low temperature performance." Apr. 20, 2005.
Edwards, Ylva, (2005) "Influence of Waxes on Bitumen and Asphalt Concrete Mixture Performance", Thesis, pp. 1-54.
Florida Department of Transportation, Standard Specifications for Road and Bridge Construction, 2007.
Forbes, Robert J., (1993) "Studies in Ancient Technology", Third Edit, E.J. Brill, pp. 1-124.
Gaudefroy et al., "Laboratory Investigations on the Mechanical Performances of Foamed Bitumen Mixes Using Half-Warm Aggregates," TRB 2007 Annual Meeting CD-ROM.
Giannattasio, Allessandro, "To improve the quality of road bitumen," Reprint from the Italian Building and Construction Issue No. 69/1998—19th Year; pp. 2, 3, 7.
Gibson, Nelson, Modified Asphalt Research Activities at FHWA's Turner-Fairbank Highway Research Center (TFHRC), Pavement Materials and Construction Team, AMAP Conference, Feb. 2005, Orlando, FL, 18 pages.
Goh et al., "Laboratory Evaluation and Pavement Design for Warm Mix Asphalt," Proceedings of the 2007 Mid-Continent Transportation Research Symposium, Ames, IA, Aug. 2007, 11 pp.
Gudimettla, Jagan M., et al., "Workability of Hot Mix Asphalt," National Center for Asphalt Technology, Apr. 2003, 66 pages.
Hollander, D., et al., (2000) "Annealing, Distilling, Reheating and Recycling: Bitumen Processing in the Ancient Near East", Paleorient, vol. 26, No. 2, pp. 83-91.
Hurley et al., "Evaluation of Aspha-MinTM Zeolite for Use in Warm Mix Asphalt," National Center for Asphalt Technology Report, Auburn University, 30 pp., Jun. 2005.
Hurley et al., "Evaluation of EvothermTM for Use in Warm Mix Asphalt," National Center for Asphalt Technology Report, Auburn University, Jun. 2006, 49 pp ..
Hurley et al., "Evaluation of Potential Processes for Use in Warm Mix Asphalt," National Center for Asphalt Technology, 2006, 46 pp.
Hurley, Graham C., et al., "Evaluation of SasobitTM for Use in Warm Mix Asphalt," National Center for Asphalt Technology Report, Auburn University, Jun. 2005, 32 pp.
International Search Report issued in PCT/US/2006/33907, mailed Sep. 24, 2007, 4 pages.
International Search Report and Written Opinion issued in PCT/US2008/075452, mailed Feb. 13, 2009, 13 pages.
International Search Report for PCT/US2009/034742, mailed May 26, 2009, 10 pages.
International Search Report and Written Opinion issued in PCT/US2009/052830, mailed Sep. 16, 2010, 9 pages.
Iterchimica Company; "Abstract of the 2005 production categories and applications," Iterchimica Brochure, p. 2 (2005).
James, A.D., et al., "Adhesion Agents for Use in Hot Mixes and Cut-Back Bituments," presented at the 3rd IRF Middle East Regional Meeting, Riyadh, Saudi Arabia, 1988, 10 pages.
Jenkins et al., "Half-Warm Foamed Bitumen Treatment, A New Process," 7th Conference on Asphalt Pavements for Southern Africa, 1999, 7 pp.
Jones, "Warm Mix Asphalt Pavements: Technology of the Future?" Asphalt, Fall 2004, pp. 8-11.
Kanitpong et al., "Laboratory Study on Warm Mix Asphalt Additives," TRB 2007 Annual Meeting CD-ROM.
Koenders et al., "Innovative process in asphalt production and application to obtain lower operating temperatures," 2nd Eurasphalt & Eurobitume Congress Barcelona 2000, Book II, pp. 830-840.
Kristjansdottir, Olof, "Warm Mix Asphalt for Cold Weather Paving," a thesis, University of Washington, 2006, 127 pp.
Kristjansdottir et al., "Assessing the Potential for Warm Mix Asphalt Technology Adoption," TRB 2007 Annual Meeting CD-ROM.
LaPointe, Dennis G., e-mail correspondence, May 2011, 4 pages.
Lavin, Patrick, "Asphalt Pavements: A practical guide to design, production and maintenance for engineers and architects," 2003, p. 347.
Logaraj, Sundaram, et al., "Surface-active bitumen additive for warm mix asphalt with adhesion promoting properties," 2009, 12 pages.
"Low Energy Asphalt (LEA) with the Performance of Hot-Mix Asphalt (HMA)", European Roads Review, Special Issue, BGRA, Feb. 2004 (pp. 1-11).
Mahoney, J.P., et al., (1982) "Sulfer Extended Asphalt Laboratory Investigation—Mixture Characterization", Highway Administration Building, Olympia, WA, retrieved from the Internet: URL:https://www.wsdot.wa.gov/research/reports/fullreports/053.2.pdf, retrieved on Jul. 13, 2017.
Malick, R.BN, Bradley, J.E., Bradbury, R.L., An Evaluation of Heated Reclaimed Asphalt Pavement (RAP) Material and Wax Modified Asphalt for Use in Recycled Hot Mix Asphalt (HMA), 2007.
Modern Asphalts, Autumn 2006, Issue No. 18.
Naidoo, P., "Fischer-Tropsch Hard Wax Chemistry in Warm Mix Asphalt Applications," Petersen Asphalt Research Conference, Abstract and Presentation Slides, Jun. 20-22, 2005.
Naidoo, P., Sasobit in Warm Mix Asphalt Applications 9 Years of Global Successes, World Asphalt Conference Presentation Slides, Mar. 14, 2006.
Notice of Opposition against EP 2 185 649 B1 (Application No. 08829379.9) of A.L.M. Holding Company filed Jan. 31, 2020, p. 13.
Paez, R., "Production of Modifier Asphalt Additives in Equator," 2005 International Symposium on Pavement Recycling, Sau Paulo, Brazil, Mar. 14-16, 2005, pp. 1-11.
Petersen, J. Claine, "Relationships Between Asphalt Chemical Composition and Performance-Related Properties," ISSA Meeting, Phoenix Arizona, Jan. 23-27, 1982, 10th page.
Progress Report 2006, The German Bitumen Forum, Jun. 2006, 36 pp.
Prowell et al., "Field Performance of Warm Mix Asphalt at the NCAT Test Track," TRB 2007 Annual Meeting CD-ROM.
Sasobit Product Information 124, 9 pgs., Apr. 22, 2004.
Sasobit Roads and Trials with Sasobit, 7 pgs.
Schwartz, Anthony M., et al., Surface Active Agents and Detergents, vol. 2, 1977, pp. 673-677.
Tarrer, A.R., et al., "The Effect of the Physical and Chemical Characteristics of the Aggregate on Bonding," Strategic Highway Research Program, Feb. 1991, 31 pages.
Transportation Research Board, 86th Annual Meeting Program, Jan. 21-25, 2007.

(56) References Cited

OTHER PUBLICATIONS

Wasiuddin et al., "A Comparative Laboratory Study of Sasobit and Aspha-Min for Warm Mix Asphalt," TRB 2007 Annual Meeting CD-ROM.
Boldyrev A.V., Avanesova H.M., Zao "Amdor", St. Petersburg, "Application the bitumen emulsions in highway engineering", (2005) cover pages—p. 3, p. 74-85, with English translation (total 19 pgs).
USSR National Standard, GOST 11508-74 "Petroleum bitumen, Methods of determination of bitumen adhesion to marble and sand" Apr. 2, 1974, No. 250. (1974) pp. 1-5.
Olaf Kristjansdottir, "Warm Mix Asphalt Technology Adoption" NVF 33 Annual Meeting, Norway, Jun. 2007, pp. 1-9.
Mats Jonsson et al., Report, Adhesion test, Swedish Road Administration, (Jul. 6, 2007) pp. 1-20, with English translation (total 40 pgs).
Barthel et al., "Warm Asphalt Mixes By Adding a Synthetic Zeolite" Proceedings of the Third Eurasphalt and Eurobitume, (2004) pp. 1241-1249.
US Department of Transportation, Background of Superpave Asphalt Mixture Design and Analysis, "Ch III, Materials Selection", Publication No. FHWA-SA-95-003, Feb. 1995, cover pages, table of contents pp. 33-52.
R.G. Hicks et al., Asphalt Paving Design Guide, Chapter 2, "Considerations for Materials, Mix Selection and Mix Design" Department of Civil Engineering, Oregon State University, prepared for Asphalt Pavement Association of Oregon, Dec. 30, 1998, cover pages, table of contents, pp. 2.1-2.15.
Freddy L. Roberts et al., Hot Mix Asphalt Materials, Mixture Design and Construction, Chapter 3. Aggerates, NAPA Education Foundation, Lanham, Maryland, 2d Ed. (1996) pp. 121-172.
US Army Corps of Engineers, "Hot-Mix Asphalt Paving Handbook 2000" AC 150/5370-14A Appendix 1, (2000) pp. 1-9.
G.P. Moss et al., Glossary of Class Names of Organic Compounds and Reactive Intermediates Based on Structure, Pure & Appl. Chem., vol. 67, Nos. 8/9, (1995) pp. 1307-1375.
M.J. Rosen, "Surfactants and Interfacial Phenomena", 3d edition, p. 26 (2024), coverpages, pp. 3-4 and 26-28.
AMDOR-9, Adhesive Dopes for Road Application, Russia, 193148, Sankt-Peresburg, Box 67, amdor1@actor.ru, English translation, total pp. 10.
US Department of Transportation, International Technology Exchange Program, Gibbs, et al., "Quiet Pavement Systems in Europe" May 2005, pp. 1-36 (total pp. 50).
Akzo Nobel, Surfactants, Wetfix BE Product Information, Akzo Nobel Surace Chemistry AB, Version: 1.0, Issued May 24, 2006, pp. 1-2.
A Wirtgen Group Company, Brochure "Innovative laboratory equipment. Preliminary testing to determine the mix quality" Wirtgen GmbH, (2016) pp. 1-16.
Techbrief, "Analytical Method to Measure Water in Asphalt and Its Application to Emulsion Residue Recovery", Turner-Fairbank Highway Research Center, www.fhwa.dot./research, FHWA Publication No. FHWA-HRT-15-056, (Jun. 2017) pp. 1-8.
International Technology Scanning Program, "Warm-Mix Asphalt: European Practice", Sponsored by US Department of Transportation, Federal Highway Administration (Feb. 2008) 72 pgs.
D. Weaire and S. Hutzler, The Physics of Foam (1999) coverpages, pp. 3, 6-7, 12.
Akzo Nobel, "REDICOTE E-6", Technical Information, Asphalt Applications, Akzo Nobel Chemicals Inc., E-6 LAS. DOC-LAS, (Apr. 11, 2003) 2 pgs.
EP No. 18 186 378.9, EPO Form 1507, Search Opinion, Oct. 17, 2018, pp. 1-7.
Akzo Nobel Surfactants—Asphalt Homepage, "The New Warm Mix System—Rediset WMX" http://www.surfactants.akzonobel.com/asphalt/newwarmmixsystem.cfm (viewed Mar. 12, 2009) 2 pgs.
Brian D. Prowell, Ph.D., P.E., "Warm Mix Asphalt" the International Technology Scanning Program, Desk Scan, National Center for Asphalt Technology, Nov. 2, 2006, coverpage, pp. i-iv, and pp. 1-20.

\* cited by examiner

WARM MIX ASPHALT BINDER COMPOSITIONS CONTAINING LUBRICATING ADDITIVES

CROSS-REFERENCES TO RELATED APPLICATIONS

This application is a continuation of U.S. application Ser. No. 16/267,830, filed on Feb. 5, 2019; which is a continuation of U.S. application Ser. No. 14/926,752, filed on Oct. 29, 2015, which is now U.S. Pat. No. 10,214,646; which is a continuation of U.S. application Ser. No. 14/223,569, filed on Mar. 24, 2014, which is now U.S. Pat. No. 9,394,652; which is a continuation of U.S. application Ser. No. 13/683,043, filed on Nov. 21, 2012, now U.S. Pat. No. 8,679,245; which is a continuation of U.S. application Ser. No. 13/112,815, filed on May 20, 2011, which is now U.S. Pat. No. 8,323,394; which is a continuation of U.S. application Ser. No. 12/896,570, filed on Oct. 1, 2010, now U.S. Pat. No. 7,968,627; U.S. application Ser. No. 12/896,532, filed on Oct. 1, 2010, now U.S. Pat. No. 7,981,952; and U.S. application Ser. No. 12/896,488, filed on Oct. 1, 2010, now U.S. Pat. No. 7,981,466; which is a divisional of U.S. application Ser. No. 11/871,782, filed on Oct. 12, 2007, now U.S. Pat. No. 7,815,725; which claims benefit to U.S. Provisional Application No. 60/976,141, filed on Sep. 28, 2007, and U.S. Provisional Application No. 60/970,809, filed on Sep. 7, 2007, all of which are incorporated herein by reference in their entirety.

BACKGROUND

International Application No. WO 2007/032915, incorporated by reference herein, reports a warm mix asphalt binder composition and process that injects a foaming, lubricating aqueous solution into a stream of asphalt cement prior to incorporation of the asphalt cement plus foaming, lubricating solution with aggregate at reduced temperatures to produce a warm mix asphalt paving mixture. Evaluations of warm mix compositions produced with this process provide a basis for the warm mix compositions and processes disclosed in this application.

SUMMARY

The present invention provides functionally dry warm mix asphalt binder compositions, polymer modified asphalt binder compositions or polymer/acid-modified asphalt binder compositions that have been modified with lubricating non-aqueous surfactants, non-surfactant additives or acids or combinations thereof (collectively, lubricating agents or additives). The term "functionally dry" as used herein in connection with compositions, aggregates or mixtures is used to describe reduced water content compositions, aggregates or mixtures, particularly those in the "warm mix" regime, as further described herein. The mentioned lubricating non-aqueous surfactants, non-surfactant additives or acids, such as phosphoric acid additives, provide asphalt binder compositions that can be adequately mixed with aggregate at temperatures 30-50° F. lower, even more than 50° F. lower, or as much as 100° F. lower than a substantially similar asphalt binder or cement that does not contain these lubricating additives or combinations thereof. In addition, these asphalt/aggregate mixtures can be compacted at temperatures 30-50° F. lower, even temperatures more than 50° F. lower, or as much as 100° F. lower than a substantially similar asphalt/aggregate mixture that does not contain a lubricating additive or combinations thereof. Another meaning for the term "functionally dry" as used herein is "essentially water-free" as described in the detailed description.

The asphalt binder compositions and aggregate mixtures that contain lubricating agents or additives disclosed in the present application may also include liquid antistripping additives used in conventional asphalt/aggregate mixtures.

Methods of preparing the present asphalt binder compositions as well as methods of using the present asphalt binder compositions mixed with aggregate to prepare paved surfaces are also disclosed in this application.

DETAILED DESCRIPTION

Figure 1:
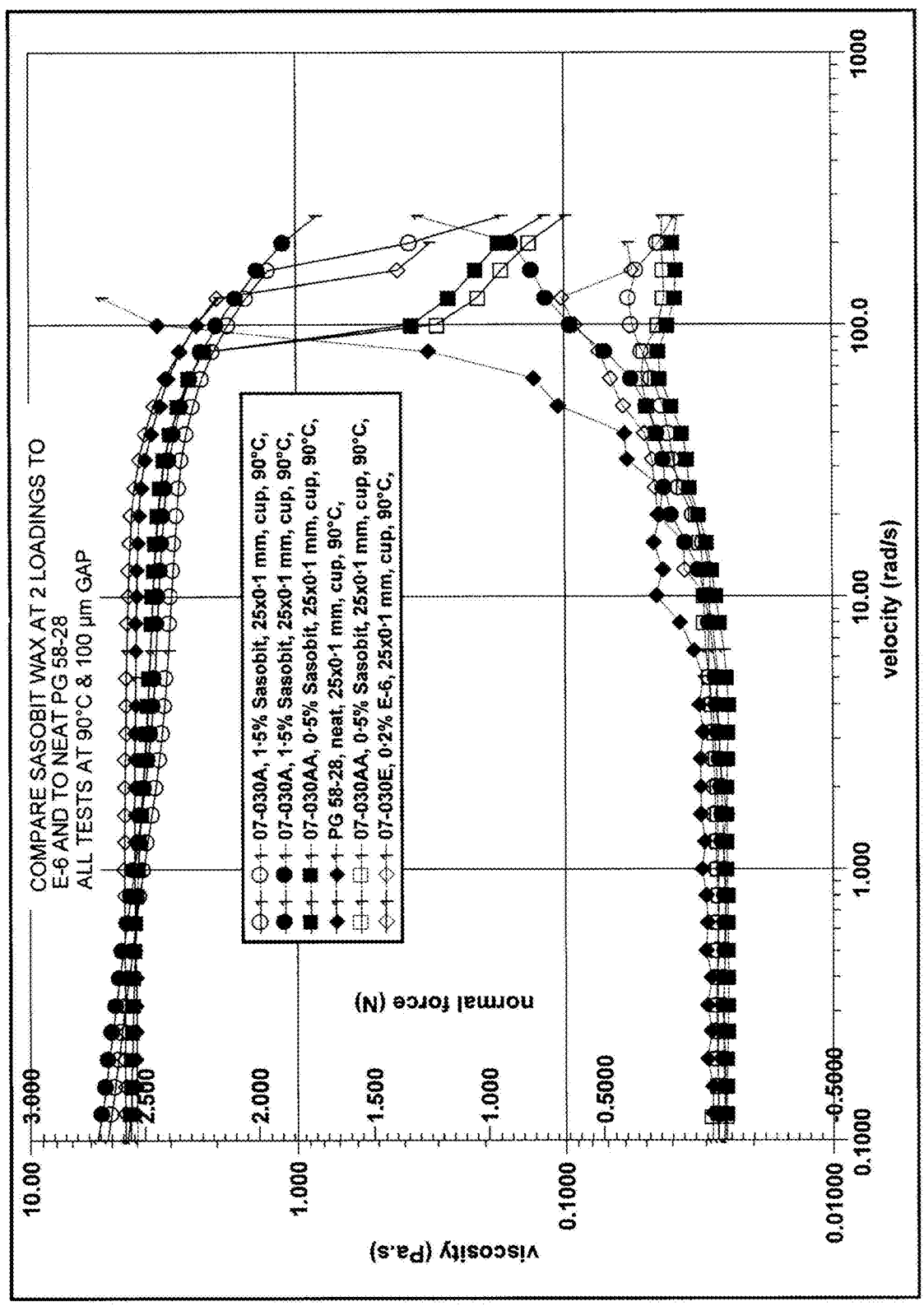
FIG. 1 is a graph plotting measured viscosity and normal force properties with respect to velocity as a measure of lubricity of an asphalt cement and an asphalt cement modified with a lubricating surfactant.

Earlier work confirms that laboratory compaction of field-produced warm mixes utilizing the reported foaming, lubricating solution can be adequately compacted at temperatures approximately 30-50° F. or more below typical hot mix asphalt compaction temperatures days after field production. Testing of mix samples taken at the paver have shown that this mix contains approximately 0.5 wt. %, or less, water which is an amount of water being well below the amount of water generally utilized in conventional warm mix production. The only component of the foaming, lubricating solution remaining with the asphalt mixture is an effective concentration of the surfactant providing the lubricating effect. This observation indicates that the incorporation of water in conjunction with a foam for the production of warm mix is not an essential component in all instances, although the water may be used in a system for delivery of the lubricating additive into the asphalt binder or cement. The present invention thus relies, in part, in determining that the lubricating properties of additives added to an asphalt binder or cement are an important component of the present warm mix asphalt mixtures and that it is not necessary or essential to use foamed asphalt binders or emulsified asphalt binders that are used in conventional warm mix asphalt binder compositions, mixtures and paving processes.

As used in the present application, each of the terms "functionally dry" or "essentially water-free" means or is intended to refer to an asphalt binder composition that contains less water or moisture than is routinely used in conventional or known warm mixes. This term does not mean and is not intended to refer to a warm mix composition that is completely free of water, moisture or added water. For example, it is well known that aggregate that will be mixed with the present asphalt binder compositions will also contain varying amounts of water and that water may affect the aggregate coating process. In embodiments of the present invention it is acceptable that there is some moisture contained in the aggregate, because a completely dry aggregate is not practical or may not be desirable. The amounts of water or moisture in the aggregate will vary for any number of reasons including but not limited to the particular geographical region where the aggregate is crushed or stockpiled, the local weather conditions, the local temperature of the particular stockpile facilities. Due to this variation in the water content of the aggregate, it is expected that there may be adjustments made to the actual water content of the asphalt binder compositions of this invention before the aggregate is coated with the asphalt mixture in order to achieve acceptable coating of the aggregate. If the aggregate is either very wet or very dry the water the water content of the aggregate may be adjusted or altered or, alternatively, the water or moisture content of the asphalt binder composition may be adjusted or altered in order to optimize or ensure adequate coating of the aggregate during mixing. Warm mixes of the present invention will generally include about 2-9 wt. % asphalt binder composition and about 91-98 wt. % aggregate. In other embodiments, the warm mixes will include about 3-8 wt. % asphalt binder composition and about 92-97 wt. % aggregate. asphalt/aggregate. The amount of asphalt binder composition required will depend upon mix type, layer in the pavement structure, aggregate size or traffic considerations, among other factors.

The moisture content of the asphalt binder composition may be changed in a number of ways such as injecting or spraying water into the asphalt binder compositions. Even though the asphalt binder compositions may have the water or moisture content adjusted or altered, these compositions are considered to be functionally dry because the overall water content is lower or substantially lower than other known or conventional warm mix asphalt binder compositions and mixtures.

In addition, it is well known that different grades of asphalt will have different mixing properties and conditions. Adjustments or alterations of the water or moisture concentrations that take into account different asphalt grades are also considered to be functionally dry (or essentially water-free) asphalt binder compositions. When variations in the water contents of different aggregates and different asphalt grades are accounted for, the asphalt/aggregate mixes of mixtures of the present invention will typically have a water content in a range of less than about 5 wt. %. In many instances the water content is less than about 1 wt. %. In certain embodiments of this invention, the asphalt binder compositions comprise less than 0.5 wt. % water. It is understood, however, that water contents outside this range would still be within the scope of the present claims and embodiments of the invention when the claimed compositions contain the lubricating agents or additives, including the non-aqueous surfactants, non-surfactant additives and acids, disclosed in this application.

This application discloses that surfactants in both aqueous or non-aqueous form and waxes are two general classes of lubricating additives that may, when incorporated into an asphalt binder or cement at levels as low as 0.1 wt. %, provide sufficient lubrication of the asphalt cement so that aggregate may be adequately coated at temperatures 30-50° F. lower, even more than 50° F. lower, or as much as 100° F. lower than the temperatures normally needed to produce a bituminous mixture without an added lubricating additive or agent. The lubricating additive then enables compaction of these mixtures at 30-50° F. lower, even more than 50° F. lower, or as much as 100° F. lower than the temperatures normally needed for compaction of similar bituminous mixtures.

Non-aqueous surfactants as additives have been commonly incorporated into asphalt cement to provide improved moisture resistance, however, their value and function as a lubricating agent in warm mix asphalt and specifically as a functionally dry or water free warm mix composition have not been readily apparent to those skilled in the art prior to the disclosure of the elements and examples of this invention and the invention referenced in U.S. Provisional Application No. 60/976,141 and U.S. Provisional Application No. 60/970,809. Suitable lubricating surfactants as additives include naturally occurring compounds and more commonly synthesized chemical compounds from three categories of surfactants: detergents, wetting agents and emulsifiers. Surfactant additives may be specifically grouped into four classifications: i) anionic surface agents to include, but not limited to, fatty acids (saturated and unsaturated fatty acids), fatty acid pitch (stearic acid pitch), and fatty acid derivatives (fatty acid esters and fatty acid sulfonates), organo phosphates (alkyl phosphates); ii) cationic surface agents to include, but not limited to, alkyl amines, alkyl quaternary ammonium salts, heterocyclic quaternary ammonium salts, amido amines, and non-nitrogenous sulfur or phosphorous derivatives; iii) ampholytic surface agents to include, but not limited to, amino acids, amino acid derivatives, betain derivatives (alkylbetains and alkylaminobetains), imidazolines, imidazoline derivatives; and iv) non-ionic surface agents to include, but not limited to, surfactants with fatty acid ester bonds (SPANS and TWEENS), surfactants with ether bonds (alkylphenolpolyoxeythylenes and plyoxyethylenated alcohols), surfactants with amide bonds (alkanolamides, mono and diethanolamides and their derivatives), alkylenated oxide copolymers and polyoxyethyleneated mercaptans.

Non-surfactant additives based on wax chemistry have been incorporated into an asphalt binder or cement to produce warm mix based on the concept that these wax additives reduce the viscosity of the wax asphalt blend to an extent sufficient to enable production and lay down of the asphalt/aggregate mixture at reduced temperatures. The data in this application indicates that typical wax additives such as Sasobit™ wax (Sasol North America Inc.) and montan wax (Romanta, Amsdorf, Germany or Strohmeyer and Arpe, NJ) used for this application have only a minor effect on reducing the viscosity of the asphalt-wax blend, but such additives, even at usage levels well below those generally employed, provide a noticeable and beneficial lubricating effect on the asphalt-wax combination. Non-surfactant additives based on wax chemistry may be selected from a group of paraffin and non-paraffin waxes. Paraffin waxes include, but are not limited to, petroleum derived and refined waxes (slack wax and refined micro-crystalline wax) while non-paraffin waxes include, but are not limited to, natural waxes (animal and vegetable waxes e.g. bees wax and carnuaba wax), modified natural waxes (brown coal derivative, e.g., montan wax and mineral oil derivatives), partial synthetic waxes (acid waxes, ester waxes, amid waxes, alcohol waxes and oxidized polyethylene waxes), or full synthetic waxes (Fischer-Tropsch waxes and polyethylene waxes).

Other non-surfactant additives such as viscosity modifiers (VMS), dispersant viscosity modifiers (DVMS), and additives containing viscosity modifiers and/or dispersant viscosity modifiers as well as extrusion and molding production processing aids, polyolefins and sulfur, may provide lubricating characteristics to petroleum products and may also be used as a non-surfactant additive for functionally dry or waterless warm mix asphalt formulations. Such additives include, but are not limited to, VMS and DVMS used in engine lubricating oils (polyisobutylenes, olefin copolymers, hydrogenated styrene-diene copolymers, styrene maleate copolymers, polymethacrylates, olefin-graft PMA polymers and hydrogenated polyisoprene star polymers) and products containing VMS and DVMS such as the residual bottoms from refined recycled engine lubricating oils; processing aids used in extrusion and molding operations (high trans content polyoctenamer reactive polymer), polyolefins (ethylene vinyl acetate (EVA), acrylic polymers and silicones); and sulfur (as sulfur impurities in fuels have been known to provide lubrication properties).

This application also discloses that different concentrations of phosphoric acid, are another class of additives that can, when incorporated into an asphalt cement at levels as low as about 0.2-1.0 wt. %, provide sufficient lubrication of the asphalt cement so that aggregate may be adequately coated at temperatures 30-50° F., or greater difference, below the temperatures normally needed to produce a bituminous mixture without the phosphoric acid additives.

The following data set out in the examples below indicate that the addition of surfactant in non-aqueous form enables utilization of asphalt cements that have been produced using acid modifiers, typically those acid modifiers being those drawn from the type of polyphosphoric acid (PPA) or superphosphoric acid (SPA), although other grades of phosphoric acid and other types of acids, such as mineral acids, other inorganic acids or organic acids, may be utilized with the present invention.

While not intending to be bound by theory, the present invention is based, in part, on the observations that the lubricating agents and additives disclosed in this application provide a warm mix having desired visco-lubricity characteristics or properties. As used in this application the term "visco-lubricity" means a characteristic of a material that it exhibits under high rotational velocity as the gap thickness of the material being tested approaches zero. As the gap thickness is reduced and as rotational velocity is increased, the material's viscosity begins to decrease but the normal force between the plates begins to increase. A material that has good visco-lubricity characteristics will exhibit less normal force increase than one which has poor visco-lubricity. Stated another way, the ability of the material being tested to enable the plates to easily rotate relative to each other becomes more important than the viscosity of the material being tested. An example illustrating the meaning of the term "visco-lubricity" is the observed reduced requirements for the mixing and compaction temperatures of polymer modified asphalt binders compared to conventional asphalt binders. Based on purely viscosity data, polymer modified binders should require mixing and compaction temperatures that are 20-50° F. higher than those which common practice have found to be adequate. Many studies have been conducted to explain this apparent contradiction however none have proven wholly satisfactory. It is now believed that these polymer systems are creating a lubricated asphalt binder having visco-lubricity properties that provide adequate mixing to coat aggregate particles and further provide mix compaction at temperatures substantially below those predicted based on viscosity alone.

Another example illustrating the meaning of the term visco-lubricity is the reduction in dry tensile strength of many mixtures produced using conventional asphalt binders combined with liquid antistrip or antistripping additives. Those skilled in the art of performing tensile strength ratio (TSR) tests to verify that bituminous mixtures will not be water sensitive, have seen that the dry tensile strength of mixtures using antistrip treated binders can be noticeably lower than the dry tensile strength of the same mix produced with the same binder but without antistrip. This observation has typically been attributed to a reduction in binder viscosity or stiffness due to the addition of the antistrip to the binder. However, there is often minor reduction in viscosity or stiffness when low levels of antistrip are added to the binder. It is now believed that this tensile strength reduction is an example of the antistrip lubricating the mix resulting in the observed reduced dry tensile strength. A typical recent example will serve to make the point.

A PG 58-28 with and without antistrip was used to produce a mix for tensile strength ratio testing according AASHTO test method T-283. Rheological properties of the PG 58-28 with and without the antistrip were determined. All results are shown in Table 1. For these particular samples there is actually a slight increase in stiffness after the addition of the antistrip (6.3% increase) and yet the dry tensile strength of the mix with the antistrip is reduced by 22.7% based on the average values of the two results using the PG 58-28 without antistrip. The wet strength is reduced by only 8.4%. This reduction in dry tensile strength, which does not occur with all mixes and all binders, is certainly a common response observed by asphalt mix design technicians. Based on the present warm mix work and lubricity testing disclosed herein, the dry tensile strengths are being reduced due to the lubricating effect of antistripping additive. The specimens tested for wet strength are typically saturated to a level of 60 to 80%. The reduced strength of saturated mixes without antistrip is typically attributed to debonding of the binder from the aggregate, which typically can be visually verified. When an antistrip functions as desired there is little or no visual debonding of binder from the aggregate, but it must be considered that reduction in wet strength of the antistrip treated mixes is beginning at the reduced value indicated by the dry strength of the antistrip treated mixes due to the lubricating effect of the antistrip.

TABLE 1

| Sample | % AC | DSR, G*/sin(δ) @ 58° C., kPa | Complex viscosity @ 58° C., Pa · s | Dry Strength, PSI | Wet Strength, PSI | TSR |
|---|---|---|---|---|---|---|
| 58-28, no antistrip | 5.5% | 1.33 | 133 | 78.2 | 51.9 | 66.4% |
| 58-28, no antistrip | 5.8% | 1.33 | 133 | 72.4 | 47.7 | 65.9% |
| 58-28, 0.3% antistrip | 5.6% | 1.42 | 142 | 58.2 | 45.6 | 78.4% |

Laboratory Testing of Lubricity

Since there are no readily available rheological tests identified for determining the lubricity of asphalt cement, the following test provides comparative testing of asphalt cement at different temperatures and with different additives to determine lubricity. This test is described as follows.

1. An AR2000 dynamic shear rheometer using a heated air test chamber was utilized.

2. A shallow cylindrical cup measuring approximately 35 mm in diameter with and approximately 5 mm in height was used to contain the liquid being tested. This cup was secured to the bottom pedestal of the test fixture in the rheometer.

3. A small quantity of the asphalt cement or asphalt cement plus lubricating additive was added to the bottom of the cup. A 25 mm diameter flat plate was used as an upper test fixture in the rheometer. This upper test fixture is a typical test fixture used in plate-plate rheological testing with this instrument.

4. The plate attached to the upper text fixture is brought into contact with the specimen in the cup and the gap is reduced until a membrane of material to be tested is either 100 or 50 μm thick.

5. The test we used is a steady shear test with increasing velocity. The specimen is maintained at a constant temperature while the upper plate rotates in one direction with a programmed increase in angular velocity. As the rotational speed increases the drag between the upper plate and the bottom of the cup increases. In addition normal force increases attempting to force the plates apart. The more lubricating character an additive has the lower the normal force buildup.

In reference to Figures, the upper sets of plotted data are for viscosity, while the lower sets of plotted data are for normal force.

Example 1 and Data Represented in FIG. 1

A neat PG 58-28 asphalt cement was tested as described above at 90° C. (194° F.) as being representative of a low end, but not uncommon, warm mix asphalt compaction temperature. A material thickness of 100 μm was used. FIG. 1 illustrates that, as the test velocity increases, the viscosity of the material is nearly steady and then begins to gradually decrease until a point is reached where the viscosity decreases very rapidly. For the neat PG 58-28 (black solid diamonds) the normal force begins to increase at a velocity of approximately 50 radians/sec. As the test velocity increases the normal force increases for the neat asphalt until the endpoint of the test is reached. The normal force increases to approximately 2.7 newtons. Several different additives and usage levels are compared in this plot. Two different tests of the PG 58-28 with 1.5 wt. % Sasobit™ wax are shown, the open and solid circles. In one test (the open circle) the normal force reached a value of approximately 1.2 newtons before the test terminated. In the other test (solid circles) the normal force reached about 0.4 newtons. Two tests at a usage level of 0.5 wt. % Sasobit™ wax are also shown (open and solid squares). In both of those tests the maximum normal force never exceeded 0.4 newtons. Lastly, E-6, an ethoxylated tallow diamine (Akzo Nobel Co.), was added at 0.2% by weight to the PG 58-28 and tested (open diamond). This sample achieved a maximum normal force of approximately 0.7 newtons before decreasing. For all blends it is possible to observe that the viscosity of the neat asphalt and the asphalt plus additives is similar from blend to blend for low to medium velocities. The normal forces are also similar until the test velocity becomes quite high. Then the blends with the additives exhibit lower normal forces and in several instances the normal force values peak and then diminish. The data in this plot supports the assertion that (1) the addition of wax additives such as Sasobit™ wax do not appreciably diminish the viscosity in the low to medium velocity ranges of the asphalt cement at warm mix compaction temperatures (regardless of dosage level) and (2) the addition of the wax additive does provide evidence of lubricating the blend compared to the control, neat PG 58-28.

Figure 2:
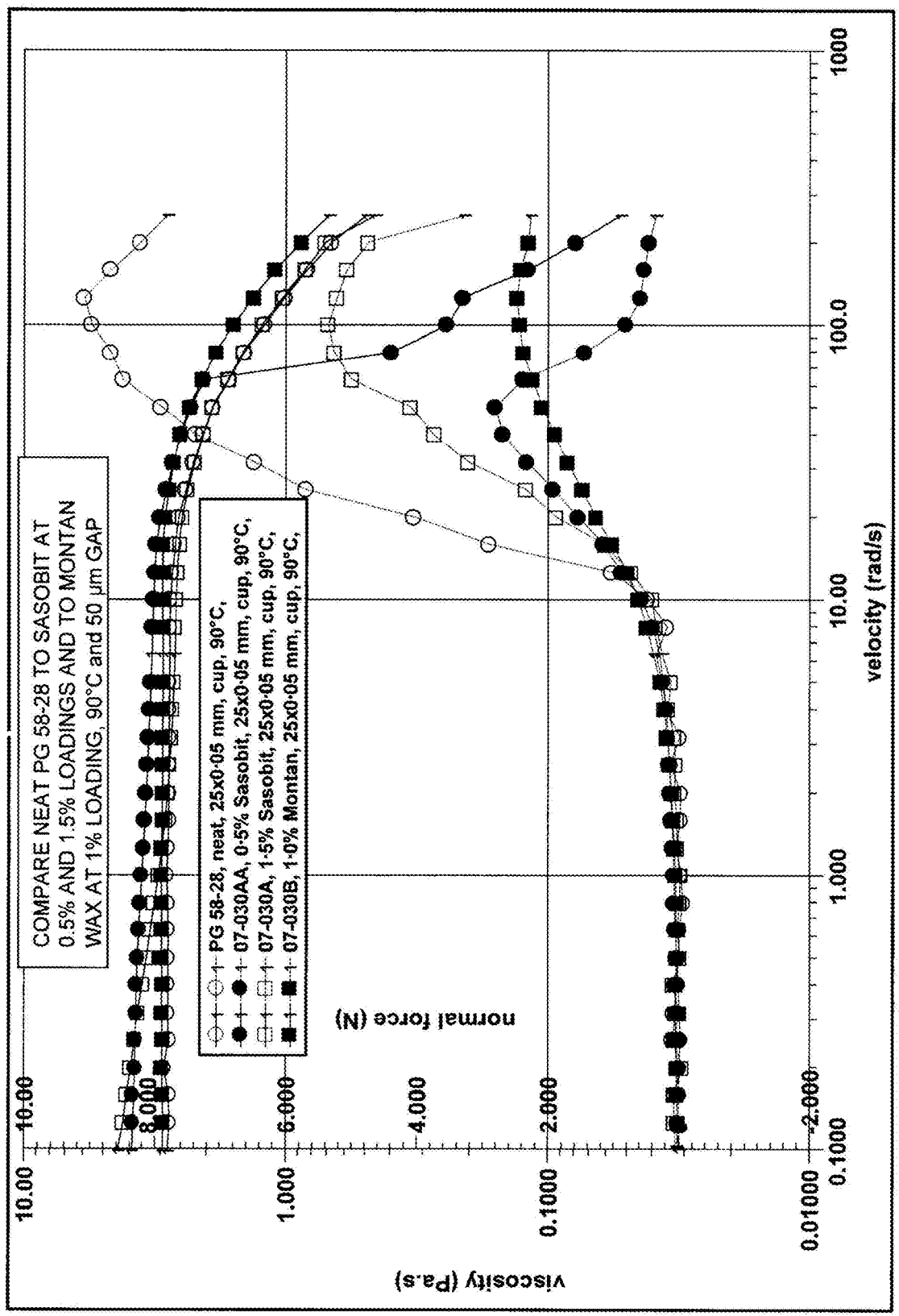
FIG. 2 is a graph plotting measured viscosity and normal force properties with respect to velocity as a measure of lubricity of an asphalt cement and two asphalt cements modified with a lubricating wax.

Example 2 and Data Represented in FIG. 2

To better differentiate between neat asphalt and asphalt containing lubricating additives, the gap in the testing fixture was reduced to 50 μm. FIG. 2 illustrates the normal force comparison of neat PG 58-28 (open circles), 1.5 wt. % Sasobit™ wax (open squares), 1% montan wax (solid squares) and 0.5 wt. % Sasobit™ wax (solid circles). The normal force for the neat PG 58-28 increases to approximately 8 newtons at 100 radians/second. The normal force for the 1.5 wt. % Sasobit™ wax increases to approximately 5.5 newtons before decreasing. Both the 1 wt. % montan wax and 0.5 wt. % Sasobit™ wax only reach a normal force maximum of about 3 newtons. For all of these blends note that the viscosities of the various samples are very nearly identical in the low and medium velocity ranges, indicating that the wax additives are not functioning by a mechanism of decreasing the viscosity of the asphalt and wax blends.

Figure 3:
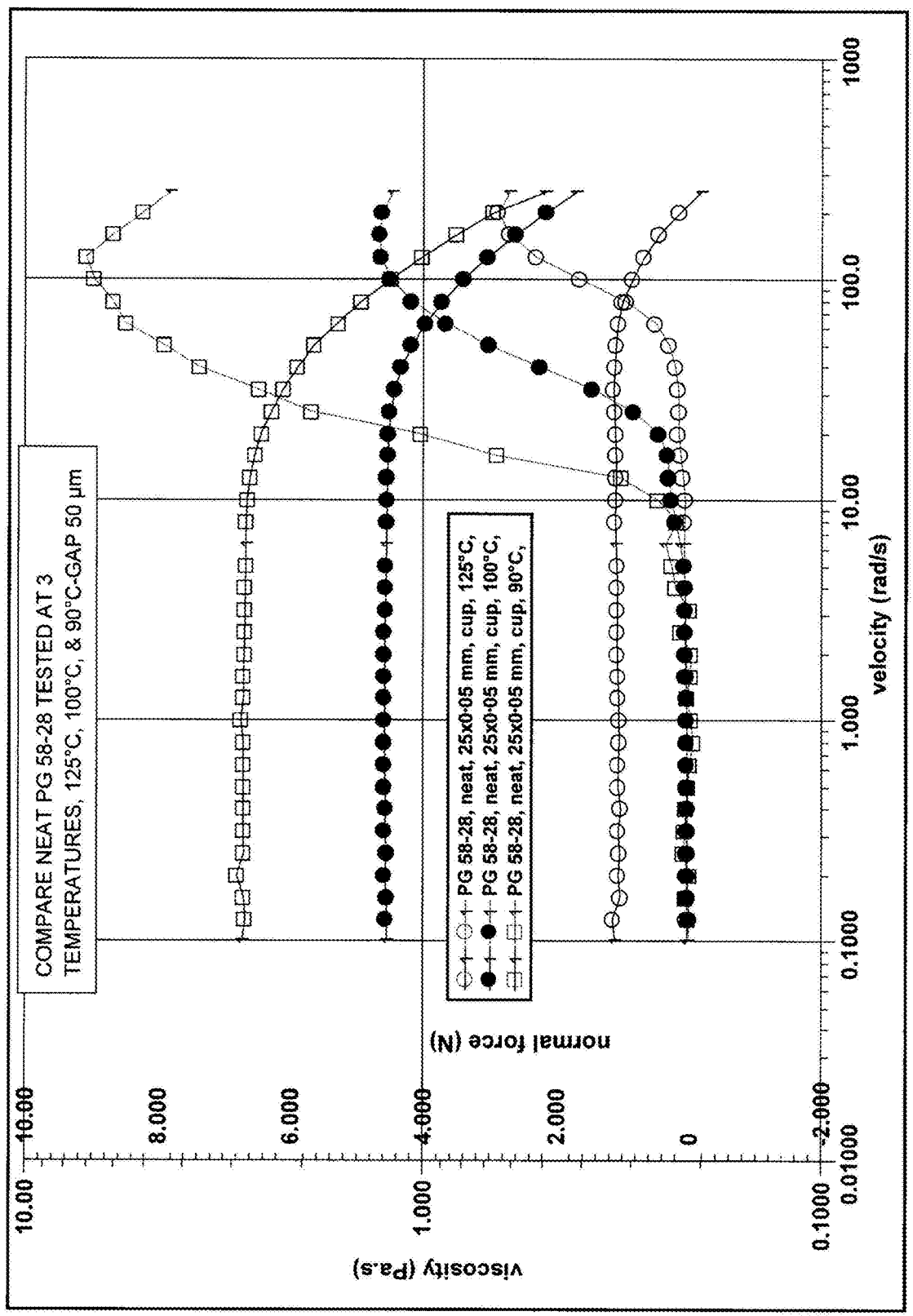
FIG. 3 is a graph plotting the measured viscosities and normal forces with respect to velocity as a measure of lubricity of an asphalt cement at three different temperatures.

Example 3 and Data Represented in FIG. 3

A common way to achieve properties suitable for an asphalt cement that enable it to be compacted is to increase its temperature. FIG. 3 illustrates the variation in viscosity and normal force for a neat PG 58-28 at 3 different temperatures; those temperatures being 90° C. (194° F.), 100° C. (212° F.) and 125° C. (257° F.). FIG. 3 illustrates that as the temperature increases the viscosity decreases, as would be expected. FIG. 3 also illustrates that between a test velocity of 10 and 20 radians/second the normal force begins to increase. As the test temperature increases the normal force peak shifts to lower values at ever increasing velocity values. At 100 radians/second the 90° C. sample exhibits a normal force of about 9 newtons, the 100° C. sample exhibits a normal force of about 4.5 newtons and the 125° C. sample exhibits a normal force of just under 2 newtons. It is instructive to realize that typical hot mix asphalt materials are initially compacted in the range of 125° C. but are not initially compacted at 90° C. This data indicates that warming a PG 58-28 provides lubricating properties in the binder that are acceptable for compaction, whereas typically contractors would not allow a paving mix to cool to a temperature as low as 90° C. before beginning compaction. Therefore hot mix and warm mix are on a continuum line of temperature and it is the nature of the additives that enable warm mix materials to be compacted adequately at temperatures in the 90-100° C. range.

Figure 4:
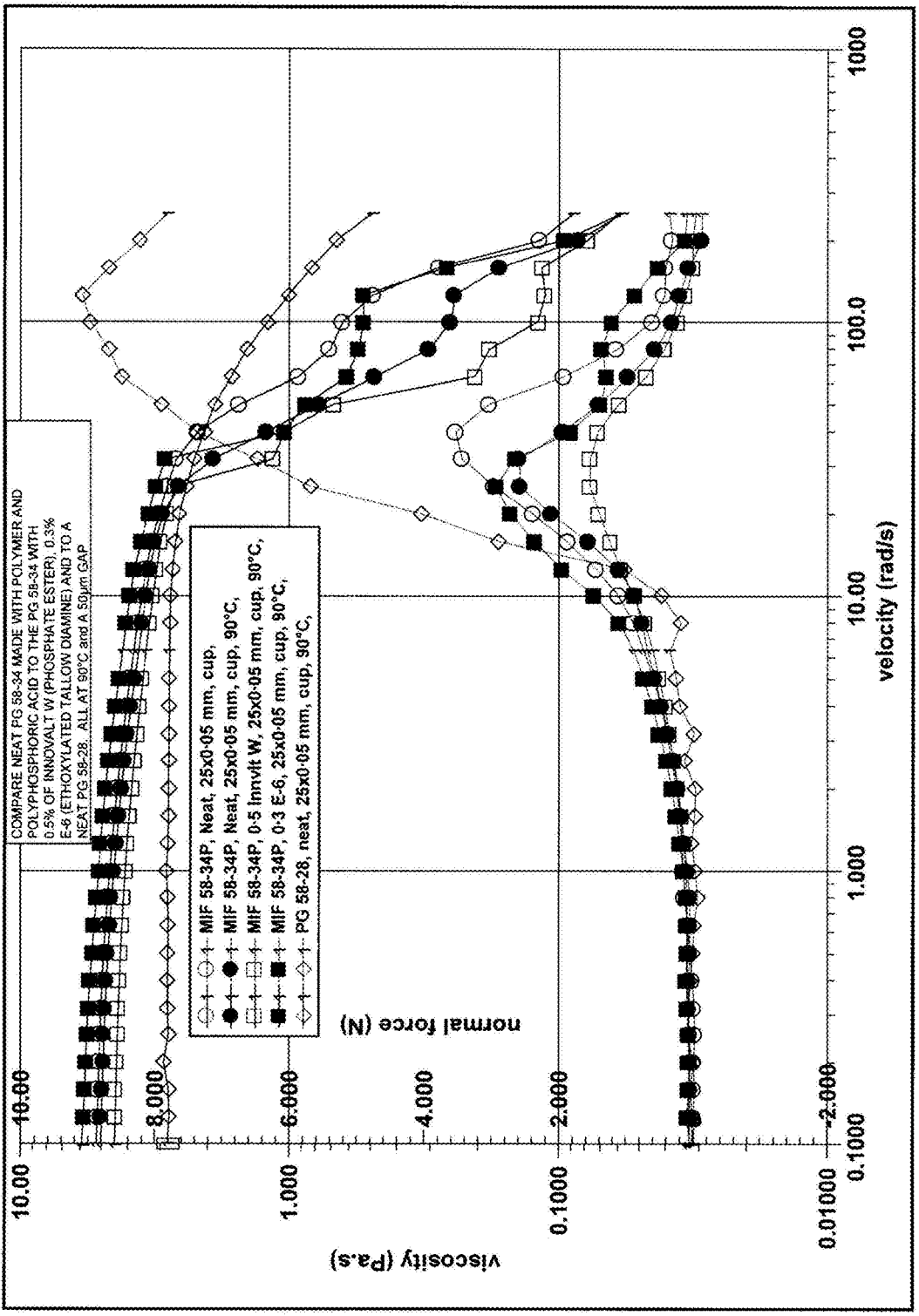
FIG. 4 is a graph plotting the measured viscosity and normal force properties with respect to velocity as a measure of lubricity of an asphalt cement, a related polymer-acid modified asphalt cement further modified with polyphosphoric acid, a polymer-acid modified asphalt cement further modified with a liquid antistripping additive and a polymer-acid modified asphalt cement further modified with a lubricating surfactant.

Example 4 and Data Represented in FIG. 4

Example 4 illustrates the impact of polyphosphoric acid (PPA) plus other additives on the reduction of normal force buildup in the asphalt binder. A polymer modified PG 58-34 which also contains PPA as a reactant was tested in duplicate (open and solid circles). Additionally 0.5 wt. % INNOVALT W phosphate ester antistripping material was added to the PG 58-34 and tested and in another sample 0.3 wt. % E-6 ethoxylated tallow diamine was added to the PG 58-34. All of these samples were compared to a standard PG 58-28. All tests were conducted at 90° C. with a 50 µm test gap. The data plotted in FIG. 4 indicate that even though the viscosity of the 58-34 and its blends (upper curves on the plot) are greater than the viscosity of the PG 58-28, the normal force values are uniformly lower at 10 radians/second and higher. The INNOVALT W added to the PG 58-34 showed the greatest reduction in normal force build-up, but the PG 58-34 with just the acid additive also showed surprising reduction in normal force relative to a neat, unmodified binder. In summary, PPA at typical usage levels (0.2 to 1 wt. %) can serve as a lubricating additive in the production of warm mix asphalt binder compositions.

Example 5

A PG 64-28 asphalt binder was made by blending 0.75 weight percent polyphosphoric acid with a PG 58-28 asphalt cement. To this blend was added 0.5 wt. % phosphate ester antistripping additive and 0.2 wt. % of E-6 ethoxylated tallow diamine. This asphalt binder blend was mixed using no water at 230° F. with a gravel aggregate. A 100% coating was achieved of the aggregate at this temperature. The mix was compacted to produce Hamburg rut testing specimens at 230° F. achieving the density values expected of a hot mix asphalt.

One test of a paved material's performance is to simulate vehicle traffic stress by the number of repetitive passes a roller supporting a specified weight load must make to cause formation of a rut of a specified depth in the material. Such testing of compacted material produced by the inventive process was done using a testing machine referred to as a Hamburg Wheel Tracking ("HWT") Tester, also known as a PMW Wheel Tracker, available from Precision Machine and Welding, Salina, Kans. The number of Hamburg passes required to reach a rut depth of 10 mm when the compacted material tested in a dry condition was used for comparative evaluation. The test conditions were 158 lb. wheel load, 52 passes per minute at the test temperature using heated air to achieve the specimen test temperature. Generally, when all other variables are essentially the same, the greater the number of passes, the better the anticipated paving mix performance. Those persons of ordinary skill in the art and familiar with the HWT will recognize paving materials that are suitable for a particular application based on the results that are provided when samples are subjected to these test conditions.

Rut tests were performed on specimens produced as identified above using completely dry aggregate and compared to rut tests performed on specimens produced using the same 64-28 plus 0.5 weight percent phosphate ester plus 0.2 weight percent of E-6 introduced using a water dispersed solution (as set out in United States Published Application 2007/0191514). Hamburg rut tests were conducted at 50° C. in a water immersed procedure. The average number of rut passes to reach 12.5 mm of rutting was 7300 for the specimens prepared according the procedure of this invention and 4176 according to the procedure using the aqueous, foaming lubricating solution. Further the binders from specimens from each rut test were extracted and recovered and the rheological properties determined at 64° C. The PG 64-28 plus 0.5 weight percent phosphate ester antistrip had a test value for G*/sin(delta) of 1.12 kiloPascals at 64° C. The binder recovered from the mixture produced using the foaming, lubricating solution had a test value of 1.27 kilo-Pascals and the binder recovered from the mixture produced using the procedure of this invention had a test value of 1.99 kiloPascals. Normally one would expect the value of G*/sin (delta) to increase as a result of mixing and recovery. While there was a slight increase using the foaming lubricating solution it is most likely that a more substantial increase was counteracted by the interaction of the polyphosphoric acid with the water from the foaming solution and the basic character of the dispersed E-6 diamine. By adding the E-6 in non-aqueous form as per this invention the value of G*/sin (delta) increased to greater and more typical extent while still maintaining the ability of the mixture to be produced and compacted under warm mix conditions. The above further supports the embodiment of the present invention for the production of warm mix using binders containing acid modifiers.

Example 6

A field trial using 300 tons of mix that was produced from PG 58-28 asphalt binder with 0.3 wt. % polyamine antistripping additive and 0.3 wt. % E-6 ethoxylated tallow diamine added. This mix was made at a counterflow drum mix plant and placed on a private road. The mix contained 20% RAP and warm mix was produced at a temperature of about 220-240° F. Compaction took place at temperatures ranging from 205-220° F. Typical hot mix temperatures for this same mix were 310° F. mix temperature and initial compaction temperatures in the range of 285° F. and higher. Field cores obtained one day after mix laydown and compaction showed results of 93.3% and 93.8% of maximum theoretical density. The target density for this mix by specification is 92.0% or greater.

Example 7

A field trial consisting of 700 tons was conducted using a PG 58-28 binder with 0.3 wt. % polyamine antistripping additive and 0.3 wt. % E-6 ethoxylated tallow diamine added. This blend was mixed with a limestone aggregate through a counterflow drum mixing facility. Warm mix was produced at temperatures varying from 210° F. to as high as 260° F. due to plant variations caused by low production rates during the trial. However, when the mix discharge temperature was stabilized at 225° F. to 235° F. the coating of the aggregate was at 100%. This mixture was further taken to an on-going road project and successfully paved at temperatures ranging from 225° F. to as low as 200° F. Cores cut from this trial pavement exhibited in place densities of 90.8%, 91.6%, 92.2%, 91.2%, 92.1% and 94.0% with values of 91-92% being typical for in place densities when this type of mix is placed as a hot mix. The mixture produced during this trial contained 20 wt. % reclaimed asphalt pavement (RAP). This is significant because the utilization of RAP is an important component of the Hot Mix Asphalt (HMA) paving industry. Although the top end amount of RAP in warm mix is a matter of choice, an amount could be greater than about 50 wt. % because of the requirement that the warm mix discharge temperature be kept low relative to conventional HMA. This same mixture when produced as a conventional hot mix asphalt was mixed at a temperature of 300-310° F. and compacted at temperatures approximately 15-20° F. cooler than the mix temperature.

Example 8

A field trial was conducted using a PG 58-28 binder with 0.3 wt. % polyamine antistripping additive and 0.3 wt. %

E-6 ethoxylated tallow diamine added. This blend was then mixed with aggregate containing 30 wt. % RAP at mixing temperatures ranging from 220-240° F. Compaction took place at temperatures ranging from 205-225° F. After this asphalt binder composition was mixed with aggregate, applied and compacted the pavement densities were determined using standard industry procedures.

The following densities were measured.
1 foot off center line—95.4% of maximum theoretical density
6 feet off center line—94.7% of maximum theoretical density
Shoulder of road paved over crushed aggregate base—92.5% of maximum theoretical density The two pavement densities were taken on pavement sections paved over conventional hot mix asphalt. Typically the first layer of mix paved over aggregate has lower densities because the underlying structure is not as rigid. Target mix density for the mix over pavement is 92% or higher and the density for shoulder mix over crushed aggregate is 91% or higher. This warm mix sample had measured physical properties that were above minimum properties for conventional heat mix samples.

Example 9

A treated asphalt binder composition of PG 58-28 binder modified with E-6 ethoxylated tallow diamine surfactant and polyamine antistripping additive was added to a tank that had held an untreated asphalt. As a mix with aggregate containing 30 wt. % RAP was beginning to be made, the untreated binder in the tank was first pumped into a mixing drum at warm mix temperatures. This untreated binder did not produce a coated asphalt/aggregate mix. After some time when the treated binder was being eventually incorporated into the mix, good coating in the 220-240° F. temperature range was achieved. Approximately 700 tons of this warm mix was placed and compacted in the field at temperatures ranging from about 212-228° F. A sample of this mix was taken for moisture content determination just as the mix was discharged from the mixing drum at a discharge temperature of about 235° F. The sample was placed in a plastic container and sealed. Within 30 minutes this sample was tested for moisture content using a solvent refluxing procedure, ASTM D 1461. The moisture content of the mix was 0.25 wt. %.

After this asphalt binder composition was mixed with aggregate, applied and compacted, the pavement densities were determined using standard industry procedures. The following densities were measured from randomly selected samples –93.3%, 93.4% and 93.8% of maximum theoretical density. Normal hot mix produced at this plant with the same aggregate and RAP materials and untreated PG58-28 was mixed at 325° F. and paved at approximately 300° F. and compacted 5-10° F. below the paving temperature.

Example 10

Using the same aggregate and RAP as Example 9, about 200 tons of warm mix using a blend of PG 58-28 binder, 0.5 wt. % Sasobit™ wax and 0.3 wt. % polyamine antistripping additive. A well coated warm mix containing 30 wt. % RAP was produced at temperatures ranging from 215-240° F. When the mix was produced on the cooler end of this temperature range, there was tendency of the mix to drag due to sticking on the paver screed. However, when the mixing temperature again increased to 240° F., the dragging of the mix disappeared. This mix appeared to compact adequately.

After this asphalt binder composition was mixed with aggregate, applied and compacted, the pavement densities were determined using standard industry procedures. The following density was measured from a randomly selected sample –93.0% of maximum theoretical density. The following density results were determined: 92.7% on the shoulder, 93.0% in the region where the mix was sticking, 93.4%, 93.5% and 93.3% at other locations on the pavement when the mixing temperature was back in the 230-240° F. range. For this project shoulder density minimum requirements were 92.0% of maximum theoretical density and mainline pavement minimum density requirements were 93.0% of maximum theoretical density.

Example 11

A laboratory mix was produced using a PG 70-22 binder modified with SBS (styrene butadiene styrene) polymer. To this blend was added 0.3% polyphosphoric acid and 0.3% PreTech Pavegrip 650 (an amine based antistrip). The asphalt temperature was 325° F. and was being used at 5.3%. The aggregate was completely dry and heated to 260° F. and verified with a certified thermometer. The mixture was put together and mixed in a bucket mixer for approximately 30 to 45 seconds. The coating was 100% and comparable to the hot mix version that was compacted previously. The heat in the bucket dropped below 240° F. before the sample was removed from the mixer. The sample was then "cured" for 2 hours at 248° F. and then compacted with 37 blows per side on the Marshall Hammer compacting machine. The resultant sample had about 5.88% average air voids. Data comparing the hot mix version and warm mix version are listed in Table 2.

TABLE 2

| Binder = PG70-22 (SBS) | Mix Temp | Compaction Temp | Blows | Air Voids |
|---|---|---|---|---|
| 0.3% PPA, 0.3% AS | 340 | 300 | 30 | 5.49 |
| 0.3% PPA, 0.3% AS | 340 | 266 | 37 | 5.59 |
| 0.3% PPA, 0.3% AS | 340 | 248 | 37 | 5.77 |
| 0.3% PPA, 0.3% AS | 260 | 248 | 37 | 5.88 |

Embodiments of the Invention

A first embodiment of the present invention is a warm mix, functionally dry asphalt binder composition comprising a lubricating surfactant. Suitable lubricating surfactants include neutral, cationic and anionic surfactants. One suitable surfactant is an ethoxylated tallow diamine surfactant. In alternative embodiments of the invention, the lubricating surfactant may be used in an amount of about 0.1-1.0 wt. % of the asphalt binder composition.

A second embodiment of the present invention is a functionally dry warm mix asphalt binder composition comprising a lubricating wax. Suitable lubricating waxes include montan waxes, petroleum waxes or amide waxes. In alternative embodiments of the invention, the lubricating wax may be used in amount of about less than 1.5 wt. % of the asphalt binder composition. In other alternative embodiments of the invention the lubricating wax may be used in an amount of about 0.1-0.5 wt. %.

A third embodiment of the present invention is a functionally dry warm mix asphalt binder composition comprising a lubricating acid such as, for example, anhydrous phosphoric acid. Suitable lubricating phosphoric acid grades include polyphosphoric acid (PPA), superphosphoric acid (SPA), or other grades of phosphoric acid. One suitable phosphoric acid derivative is polyphosphoric acid. In alternative embodiments of the invention, the lubricating phosphoric acid derivative may be used in an amount of about 0.2-1.0 wt. % of the asphalt binder composition.

Both the first, second and third embodiments of the present asphalt binder compositions may be mixed with aggregate at a temperature of about 280° F. and lower temperatures (where this mixing temperature may be a function of the original or starting PG asphalt grade, viscosity or penetration of the binder) and that the then resultant mixture may be compacted at a temperature of about 260° F. and lower temperatures (where this compaction temperature may also be a function of the original or starting PG asphalt grade, viscosity or penetration of the binder). Hot mix asphalt mixtures produced from the same binders not utilizing the present invention are reasonably anticipated to require respective mixing and compaction temperatures 70-100° F. higher that those temperatures stated above.

Another embodiment of the present invention is a functionally dry warm mix polymer/acid modified asphalt binder composition comprising a lubricating surfactant, a lubricating wax or both.

Still another embodiment of the present invention is a functionally dry warm mix polymer modified asphalt binder composition comprising a lubricating surfactant, a lubricating wax or both.

This embodiment provides a modified asphalt binder composition that can be mixed with aggregate at a temperature that is at least 30-50° F. below, even temperatures more than 50° F. lower, or as much as 100° F. lower than the temperature that is adequate to mix a similar modified asphalt binder composition that does not contain a lubricating surfactant, a lubricating wax or a lubricating acid or combinations thereof.

The present invention also includes forming a paved surface using the novel warm mix composition described herein. In this aspect, a paving mix may be made in the temperature ranges described herein using the composition described. The mixing typically occurs away from the paving site, and the mixture is then hauled to the site and supplied to a paving machine. The mixture of the lubricated asphalt binder composition and aggregate is then applied by the paving machine to a prepared surface after which it is usually roller compacted by additional equipment while still at an elevated temperature. The compacted aggregate and asphalt mixture eventually hardens upon cooling. Because of the large mass of material in paving a roadway or commercial parking lot, the cost of the thermal energy to achieve suitable mixing and paving is reduced because of the reduction in the temperature necessary in the mixture for proper paving. This will result in cost savings attributable to the present invention because of the reduced need for thermal energy to be supplied or maintained in the mixture. For common binders used in the practice of the present invention, the visco-lubricity characteristics of the binder and lubricating agent composition affect the temperature needed to provide thorough coating of the aggregate and application and compaction of the asphalt and aggregate mixture according to the present invention.

Accordingly, in one aspect, the present invention includes a paved surface formed using the novel warm mix composition described herein. Such a paved surface comprises a compacted mixture of an aggregate and a functionally dry warm mix asphalt binder composition including an asphalt binder, and one or more members selected from the group consisting of a lubricating surfactant, a lubricating non-surfactant additive, a lubricating acid or combinations thereof. In another aspect, the present invention includes a method of forming a paved surface using the novel warm mix composition described herein.

The present inventive process includes adding a lubricating substance into an asphalt binder heated to within a warm mix temperature range to create a warm mix lubricated asphalt binder composition; combining the warm mix lubricated asphalt binder composition with a suitable aggregate; mixing to coat the aggregate with the lubricated asphalt binder composition to form a warm mix paving material; transferring the warm mix paving material to a paving machine; applying the warm mix paving material with the paving machine at a warm mix paving temperature to a prepared surface; and then compacting the applied paving material to form a paved surface.

The invention is not to be taken as limited to the details of the above description as modifications and variations may be made without departing from the spirit or scope of the invention.

The invention claimed is:

1. An asphalt paving composition comprising i) functionally dry, essentially water-free non-foamed asphalt binder containing ii) lubricating additive comprising lubricating surfactant, lubricating acid, or combination thereof, mixed with iii) uncompacted aggregate, wherein the functionally dry, essentially water-free non-foamed binder coats the uncompacted aggregate, and the asphalt paving composition is compactable to at least 91% of theoretical density at, and is at, a temperature at least 30° F. lower than a temperature needed for compaction of a comparison asphalt paving composition that does not contain the lubricating surfactant, lubricating acid or combination thereof.

2. The asphalt paving composition of claim 1 wherein the lubricating additive comprises lubricating surfactant.

3. The asphalt paving composition of claim 2 wherein the lubricating surfactant comprises a cationic surfactant.

4. The asphalt paving composition of claim 2 wherein the lubricating surfactant comprises an alkyl amine, amido amine, alkyl quaternary ammonium salt or heterocyclic quaternary ammonium salt.

5. The asphalt paving composition of claim 2 wherein the lubricating surfactant comprises ethoxylated tallow diamine.

6. The asphalt paving composition of claim 2 wherein the lubricating surfactant comprises a non-nitrogenous sulfur or phosphorous derivative.

7. The asphalt paving composition of claim 2 wherein the amount of lubricating surfactant is about 0.1-0.5 wt % of the non-foamed asphalt binder weight.

8. The asphalt paving composition of claim 1 wherein the lubricating additive comprises lubricating acid.

9. The asphalt paving composition of claim 8 wherein the lubricating acid is polyphosphoric acid.

10. The asphalt paving composition of claim 1 wherein the non-foamed asphalt binder comprises a polymer modified asphalt binder or a polymer and acid modified asphalt binder.

11. The asphalt paving composition of claim 1 wherein the aggregate is adjusted to a water content below about 5 wt % before being mixed with the asphalt binder composition.

12. The asphalt paving composition of claim 1 wherein the aggregate includes up to 100 wt % reclaimed asphalt pavement.

13. The asphalt paving composition of claim 1 wherein the composition is compactable to at least 91% of theoretical density at a temperature more than 50° F. lower than the temperature needed for compaction of the comparison asphalt paving composition that does not contain the lubricating surfactant, lubricating non-surfactant, lubricating acid, or combination thereof.

14. The asphalt paving composition of claim 1 wherein the composition is compactable to at least 91% of theoretical density at a temperature more than 100° F. lower than the temperature needed for compaction of the comparison asphalt paving composition that does not contain the lubricating surfactant, lubricating non-surfactant, lubricating acid or combination thereof.

15. The asphalt paving composition of claim 1 wherein the composition is compactable to at least 91% of theoretical density at a temperature of about 200-260° F.

16. The asphalt paving composition of claim 1 wherein the asphalt paving composition is at a warm mix temperature.

17. The asphalt paving composition of claim 1 wherein the asphalt paving composition is at a temperature of about 280° F. or lower.

18. The asphalt paving composition of claim 1 wherein the asphalt paving composition is compactable at, and is at, a temperature of about 260° F. or lower.

19. The asphalt paving composition of claim 1 wherein the asphalt paving composition is compactable at, and is at, a temperature of about 230° F. or lower.

20. An asphalt pavement comprising the asphalt paving composition of claim 1 compacted to at least 91% of theoretical density at a temperature of about 260° F. or lower.

21. The asphalt pavement of claim 20 compacted to at least 93% of theoretical density.

* * * * *